(12) United States Patent
Lee et al.

(10) Patent No.: US 11,773,910 B2
(45) Date of Patent: Oct. 3, 2023

(54) BALL BEARING ROLLER ASSEMBLY (71) Applicant: SEGOS CO., LTD., Incheon (KR)

(72) Inventors: Doo Myun Lee, Incheon (KR); Dong Hyun Kim, Yangju-si (KR); Sai Ryun Kim, Incheon (KR); Gwang Jun Hwang, Uijeongbu-si (KR)

(73) Assignee: SEGOS CO., LTD., Incheon (KR)

( * ) Notice: Subject to any disclaimer, the term of this patent is extended or adjusted under 35 U.S.C. 154(b) by 0 days.

(21) Appl. No.: 17/775,364

(22) PCT Filed: Jul. 27, 2020

(86) PCT No.: PCT/KR2020/009885
§ 371 (c)(1),
(2) Date: May 9, 2022

(87) PCT Pub. No.: WO2021/091047
PCT Pub. Date: May 14, 2021

(65) Prior Publication Data
US 2022/0381296 A1    Dec. 1, 2022

(30) Foreign Application Priority Data
Nov. 7, 2019 (KR) .......... 10-2019-0141762

(51) Int. Cl.
*F16C 19/06* (2006.01)
*F16C 33/60* (2006.01)
(Continued)

(52) U.S. Cl.
CPC .............. *F16C 43/04* (2013.01); *A47L 15/50* (2013.01); *F16C 19/06* (2013.01); *F16C 33/605* (2013.01);
(Continued)

(58) Field of Classification Search
CPC ........ F16C 19/06; F16C 33/605; F16C 43/04; F16C 2314/00; A47L 15/50; A47L 15/501; A47L 15/507
See application file for complete search history.

(56) References Cited

U.S. PATENT DOCUMENTS

| 389,231 | A | * | 9/1888 | Lake | ............ | F16C 19/20 |
| | | | | | | 384/521 |
| 630,101 | A | * | 8/1899 | Parkin | ............ | F16C 43/06 |
| | | | | | | 384/511 |

(Continued)

FOREIGN PATENT DOCUMENTS

DE      102009002671 A1 * 10/2010 ........... A47L 15/507
FR      669436 A * 11/1929
(Continued)

OTHER PUBLICATIONS

KR20190104779_A_DESCRIPTION.*
(Continued)

*Primary Examiner* — Phillip A Johnson
(74) *Attorney, Agent, or Firm* — Sughrue Mion, PLLC (57) ABSTRACT

One embodiment of the present invention provides a ball bearing roller assembly comprising an inner ring having an insertion hole into which a protrusion of a storage body is inserted; an outer ring having a hollow through which the inner ring is inserted, and provided outside the inner ring, at least one ball bearing provide between the inner ring and the outer ring, and in rolling contact with the inner ring and the outer ring; a cover inserted and coupled to a space between the inner ring and the outer ring, and fixing the ball bearing to the outer circumferential surface of the inner ring and the inner circumferential surface of the outer ring and a detachable coupling portion formed to extend from one end portion (Continued)

of the inner ring, and having an insertion space portion into which a vertical wire of the storage body is inserted.

7 Claims, 8 Drawing Sheets

(51) Int. Cl.
  *A47L 15/50* (2006.01)
  *F16C 43/04* (2006.01)
(52) U.S. Cl.
  CPC ......... *A47L 15/507* (2013.01); *F16C 2314/00* (2013.01)

(56) References Cited

U.S. PATENT DOCUMENTS

| | | | | |
|---|---|---|---|---|
| 854,505 | A | * | 5/1907 | Keiper .................. F16C 33/605 384/521 |
| 3,469,892 | A | * | 9/1969 | Langstroth ............ F16C 13/006 16/98 |
| 2018/0192852 | A1 | * | 7/2018 | Hansen ................. A47L 15/507 |

FOREIGN PATENT DOCUMENTS

| | | |
|---|---|---|
| JP | 2018-141479 A | 9/2018 |
| KR | 10-2017-0137473 A | 12/2017 |
| KR | 10-2019-0071554 A | 6/2019 |
| KR | 10-2019-0104779 A | 9/2019 |
| WO | 2010-124957 A1 | 11/2010 |
| WO | 2012-089779 A1 | 7/2012 |

OTHER PUBLICATIONS

FR669436_A_DESCRIPTION.*
DE102009002671_A1_DESCRIPTION.*
International Search Report for PCT/KR2020/009885 dated Nov. 17, 2020.

* cited by examiner

BALL BEARING ROLLER ASSEMBLY

CROSS REFERENCE TO RELATED APPLICATIONS

This application is a National Stage of International Application No. PCT/KR2020/009885 filed Jul. 27, 2020, claiming priority based on Korean Patent Application No. 10-2019-0141762 filed Nov. 7, 2019, the entire disclosures of which are incorporated herein by reference.

TECHNICAL FIELD

The present invention relates to a ball bearing roller assembly. More specifically, the present invention relates to a ball bearing roller assembly having the structure of fixing a ball to an annular groove formed on the outer circumferential surface of an inner ring and the inner circumferential surface of an outer ring using a cover, and provided with a pair of detachable coupling parts forming an insertion space part into which a vertical wire is inserted.

BACKGROUND ART

A dishwasher is a machine used to clean dishware automatically using electricity.

Such dishwashers clean soiling such as food particles stuck on the dishware by spraying cleaning liquid and washing water to the dishware contained in the basket-shaped storage body and dry the dishware that has been washed.

As such, the dishwasher can conveniently do a large amount of dishes as the processes of washing and drying dishware are automatically performed.

Generally, the storage body for storing the dishware is provided with a moving member. With the moving member, users can store the storage body inside the main body of the dishwasher or conveniently draw the storage body to the outside upon completion of dish washing.

However, conventional moving members coupled to the storage body have a problem that shaking occurs when the storage body is moved, because the moving member is not firmly coupled with the storage body.

In addition, conventional moving members coupled to the storage body have a problem there is a difficulty in changing the moving member in the event of a breakdown, because the structure of detaching the moving member from the storage body is complicated.

PRIOR ART LITERATURE (Patent literature 1) Korean Patent Laid-open No. 2017-0137473 (Dec. 13, 2017)

DETAILED DESCRIPTION OF INVENTION

Technical Task

The present invention aims at solving the problems of prior art as described above, and it is an object of the present invention to provide a ball bearing roller assembly having the structure of fixing a ball to an annular groove formed on the outer circumferential surface of an inner ring and the inner circumferential surface of an outer ring using a cover, and provided with a pair of detachable coupling parts forming an insertion space part into which a vertical wire is inserted.

Means for Solving Technical Task

In order to achieve the above object, an aspect of the present invention provides a ball bearing roller assembly, comprising an inner ring having an insertion hole into which a protrusion of a storage body is inserted; an outer ring having a hollow through which the inner ring is inserted, and provided outside the inner ring; at least one ball bearing provided between the inner ring and the outer ring, and being in rolling contact with the inner ring and the outer ring; a cover coupled with the outer ring, and fixing the ball bearing to the outer circumferential surface of the inner ring and the inner circumferential surface of the outer ring; and a detachable coupling part formed to extend from one end of the inner ring, and provided with an insertion space part into which a vertical wire of the storage body is inserted.

According to an embodiment of the present invention, an annular groove in rolling contact with the ball bearing may be formed on the outer circumferential surface of the inner ring.

According to an embodiment of the present invention, the detachable coupling part may comprise a pair of fixing parts having one end coupled to the inner ring; and a receiving part connecting the pair of fixing parts spaced apart from each other, and receiving the vertical wire, wherein the pair of fixing parts spaced apart from each other forms the insertion space part, and the width of the insertion space part is formed to be smaller than the width of the vertical wire.

According to an embodiment of the present invention, the pair of fixing parts may be provided with a support part having one end coupled to the inner ring; a connection part formed to extend from the support part, and bent in the inward direction; and a separation preventing part formed to extend from the connection part, and preventing separation of the vertical wire when the vertical wire is inserted.

According to an embodiment of the present invention, the outer surface of the connection part may be formed in a gently curved shape to facilitate insertion of the vertical wire.

According to an embodiment of the present invention, the outer ring may comprise a body part into which the inner ring is inserted; and a guide flange having an outer diameter greater than the body part, and connected with the body part.

According to an embodiment of the present invention, the inner ring and the outer ring may be configured to perform predetermined relative movement in the width direction W according to the degree of width direction W coupling depth with which the cover is coupled with the outer ring.

Effect of Invention

According to an aspect of the present invention, the ball bearing roller assembly has a simple structure of detachment from the storage body, and accordingly a user may conveniently change the ball bearing roller assembly in the event of a breakdown.

Also, the ball bearing roller assembly forms an insertion space part into which a vertical wire is inserted, thereby ensuring firm coupling with the storage body. Accordingly, shaking may be prevented when the ball bearing roller assembly is moved.

In addition, the ball bearing roller assembly may be assembled in a simple coupling manner, thereby improving productivity.

The effects of the present invention are not limited to the above-mentioned effects, and it should be understood that the effects of the present invention include all effects that could be inferred from the configuration of the invention described in the detailed description of the invention or the appended claims.

DETAILED MEANS FOR CARRYING OUT THE INVENTION

Hereinafter, the present invention will be explained with reference to the accompanying drawings. The present invention, however, may be modified in various different ways, and should not be construed as limited to the embodiments set forth herein. Also, in order to clearly explain the present invention in the drawings, portions that are not related to the present invention are omitted, and like reference numerals are used to refer to like elements throughout the specification.

Throughout the specification, it will be understood that when a portion is referred to as being "connected" to another portion, it can be "directly connected to" the other portion, or "indirectly connected to" the other portion having intervening portions present. Also, when a component "includes" an element, unless there is another opposite description thereto, it should be understood that the component does not exclude another element but may further include another element.

Hereinafter, the embodiments of the present invention will be described in detail with reference to the accompanying drawings.

Figure 1:
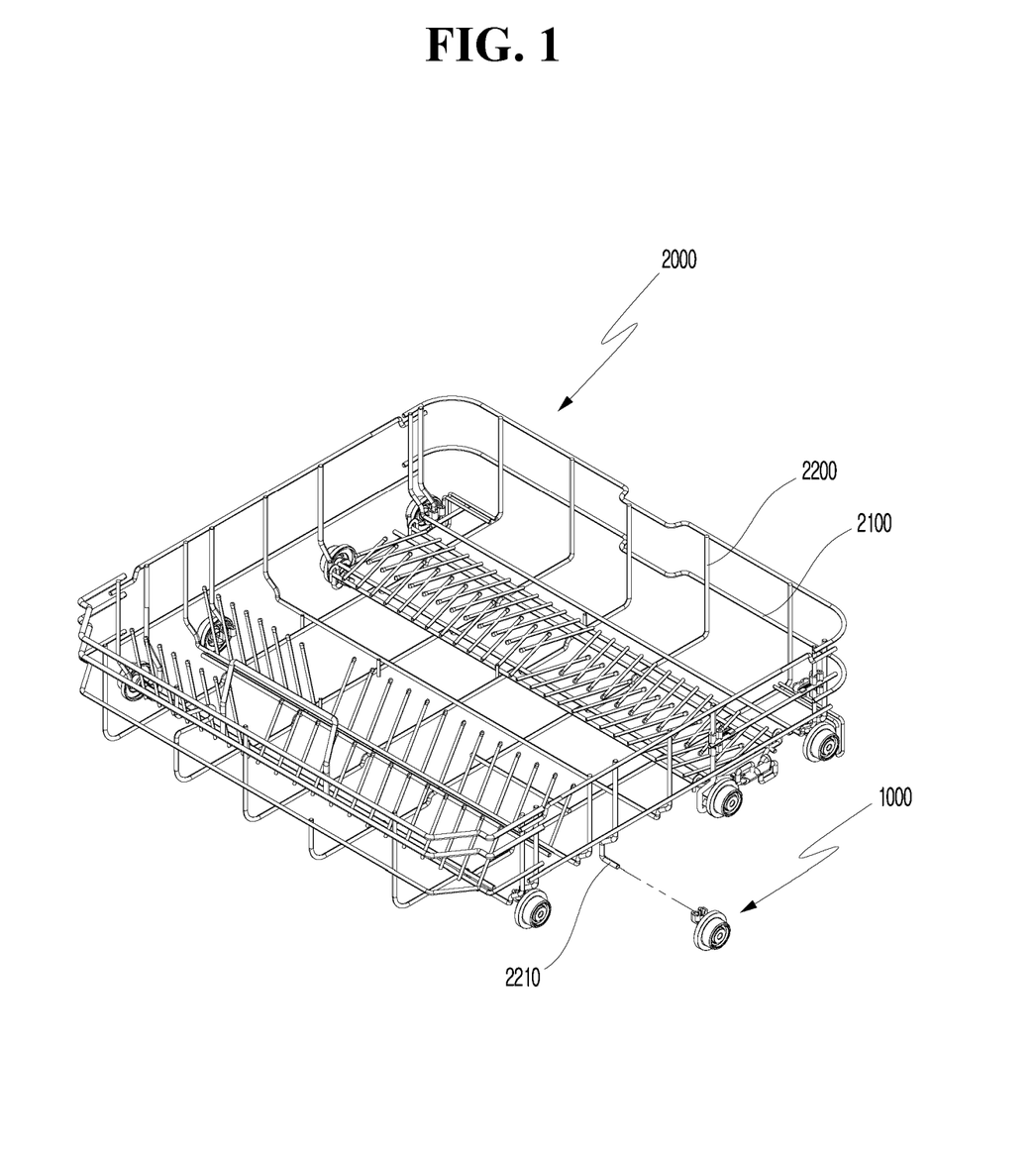
FIG. 1 is a perspective view illustrating a storage body provided with a ball bearing roller assembly according to an embodiment of the present invention.
Figure 2:
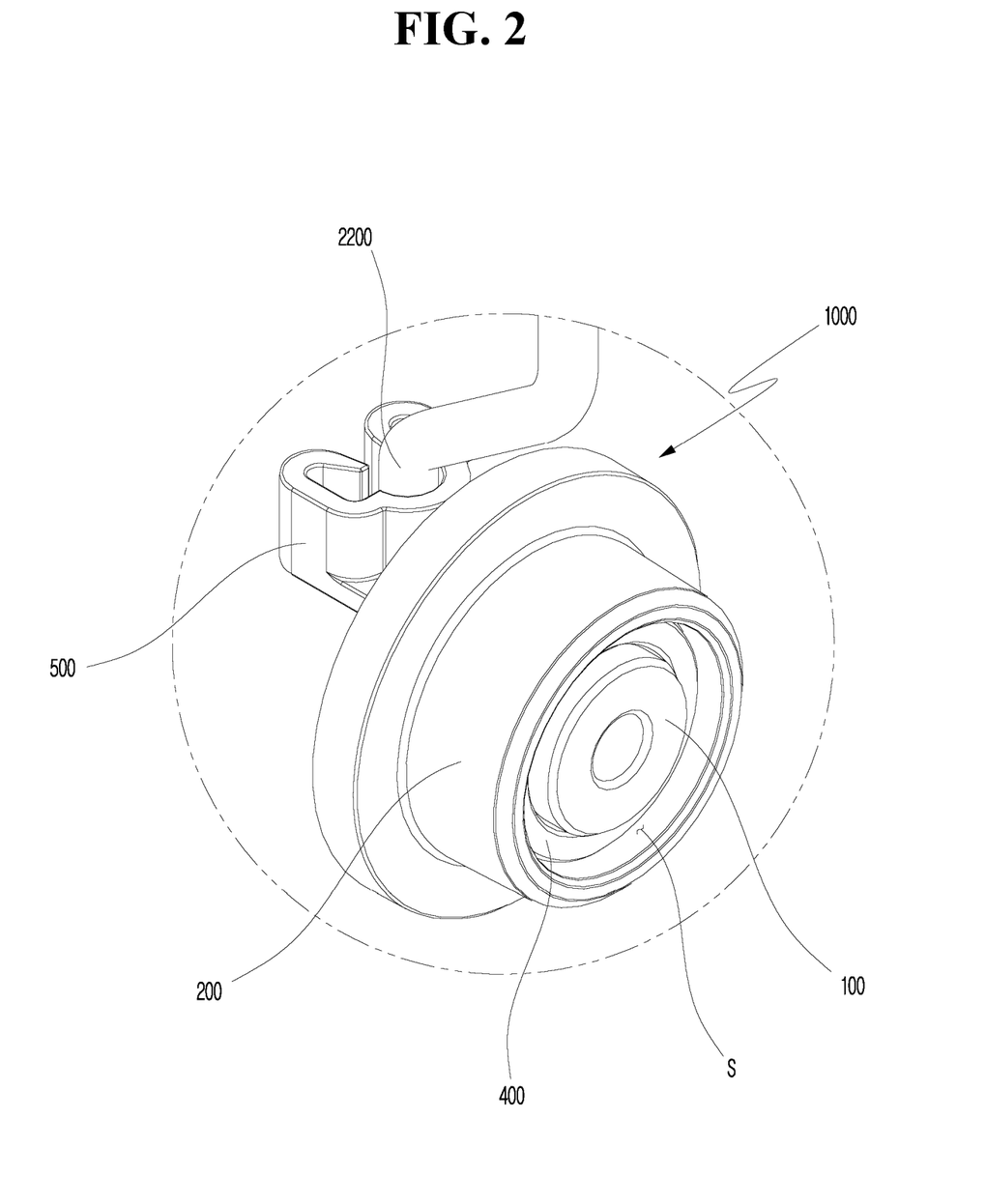
FIG. 2 is a perspective view illustrating the main part of a storage body coupled with a ball bearing roller assembly according to an embodiment of the present invention.

FIG. 1 is a perspective view illustrating a storage body provided with a ball bearing roller assembly according to an embodiment of the present invention; FIG. 2 is a perspective view illustrating the main part of a storage body coupled with a ball bearing roller assembly according to an embodiment of the present invention; and FIG. 3 is a cross-sectional view of the coupling of a storage body provided with a ball bearing roller assembly according to an embodiment of the present invention.

Figure 3:
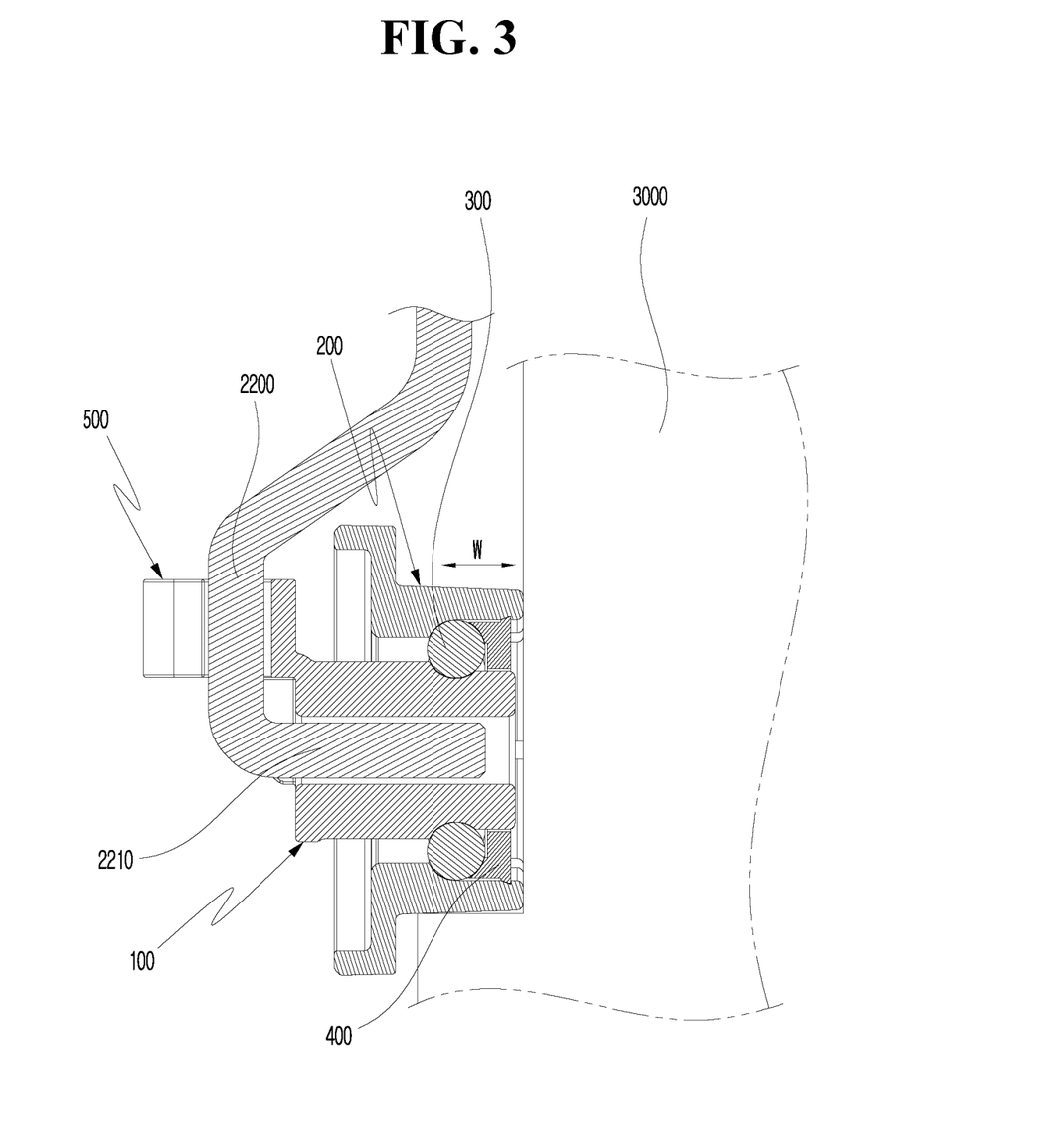
FIG. 3 is a cross-sectional view of the coupling of a storage body provided with a ball bearing roller assembly according to an embodiment of the present invention.

As illustrated in FIG. 1 to FIG. 3, a ball bearing roller assembly 1000 is detachable from a storage body 2000.

Here, the storage body 2000 may be a storage body 2000 provided in household appliances, and such storage bodies 2000 may contain a variety of objects. For example, when the household appliance is a dishwasher, the objects contained in the storage body 2000 may be dishware.

The present invention explains as an example a case where the household appliance is a dishwasher.

The storage body 2000 may comprise, for example, a horizontal wire 2100 and a vertical wire 2200. Here, the horizontal wire 2100 and the vertical wire 2200 are defined as that when the storage body 2000 is transversely cut, a wire whose longitudinal direction is vertical is the vertical wire 2200, and a wire whose longitudinal direction is horizontal is the horizontal wire 2100.

In the storage body 2000, the lower end of the vertical wire 2200 and the horizontal wire 2100 are connected to each other, and may form the bottom surface of the storage body 2000.

The horizontal wire 2100 and the vertical wire 2200 form a net shape and provide a storage space for objects (dishware, etc.).

In addition, the ball bearing roller assembly 1000 is detachable from the storage body 2000.

Here, the ball bearing roller assembly 1000 is coupled with a vertical wire 2200 having a protrusion 2210 formed at the end thereof among a plurality of vertical wires 2200. The coupling between the ball bearing roller assembly 1000 and the protrusion 2210 is described in detail later herein.

Here, the storage body 2000 is not necessarily limited to the aforementioned shape, but may be in various shapes depending on the type of household appliance.

As such, as the roller unit 1000 is coupled to the storage body 2000, the storage body 2000 may be conveniently stored into the main body of the dishwasher and drawn to the outside.

Figure 4:
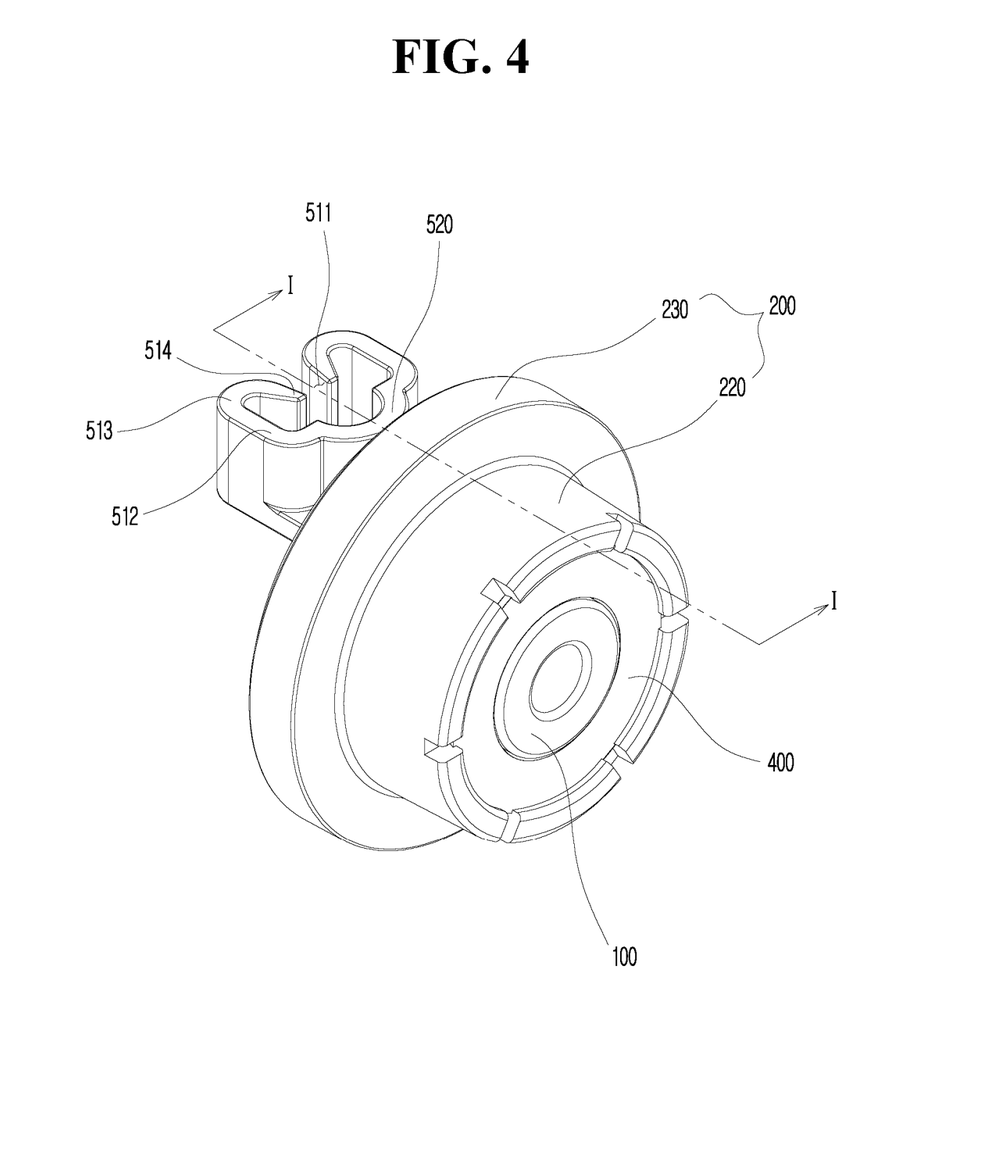
FIG. 4 is a front perspective view of a ball bearing roller assembly according to an embodiment of the present invention.
Figure 5:
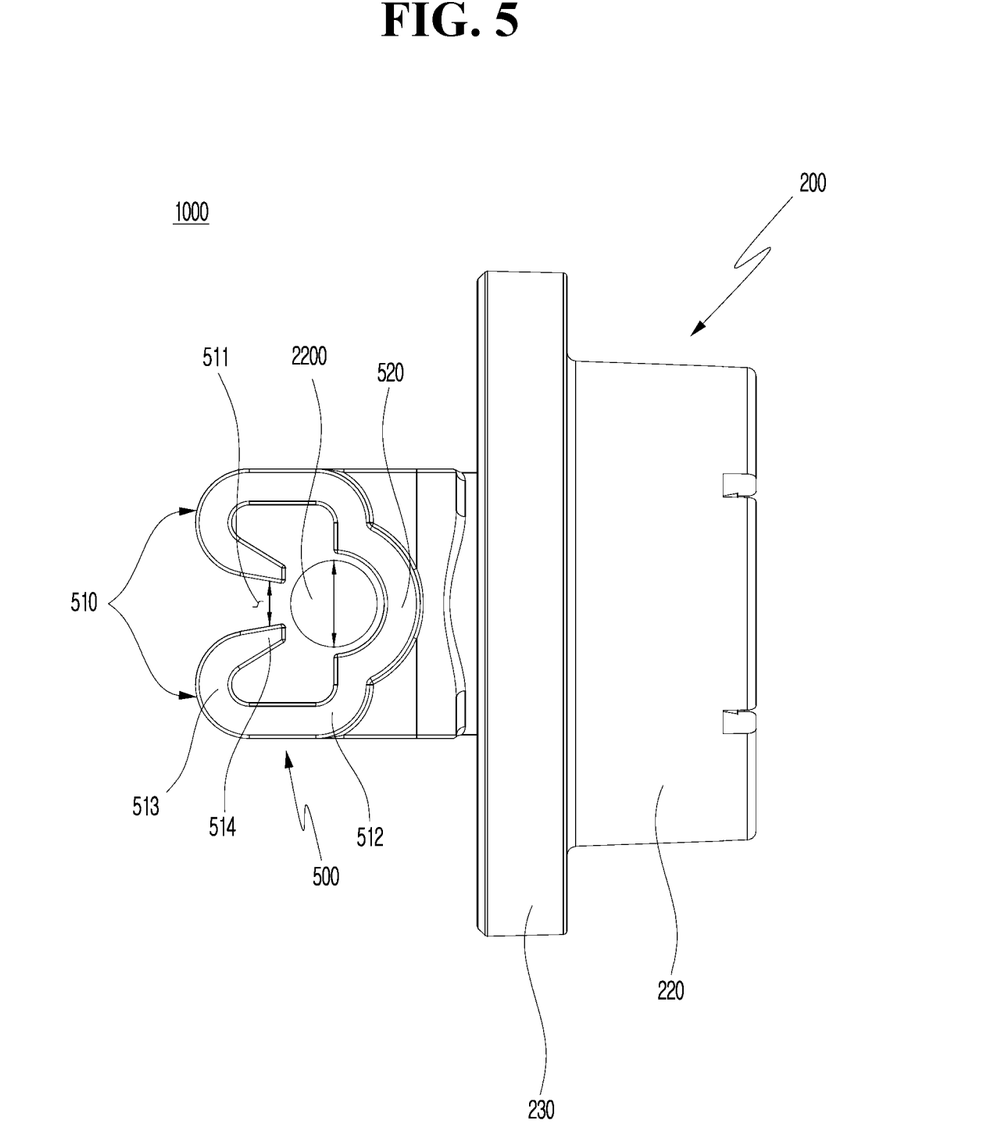
FIG. 5 is a plane view of a ball bearing roller assembly according to an embodiment of the present invention.
Figure 6:
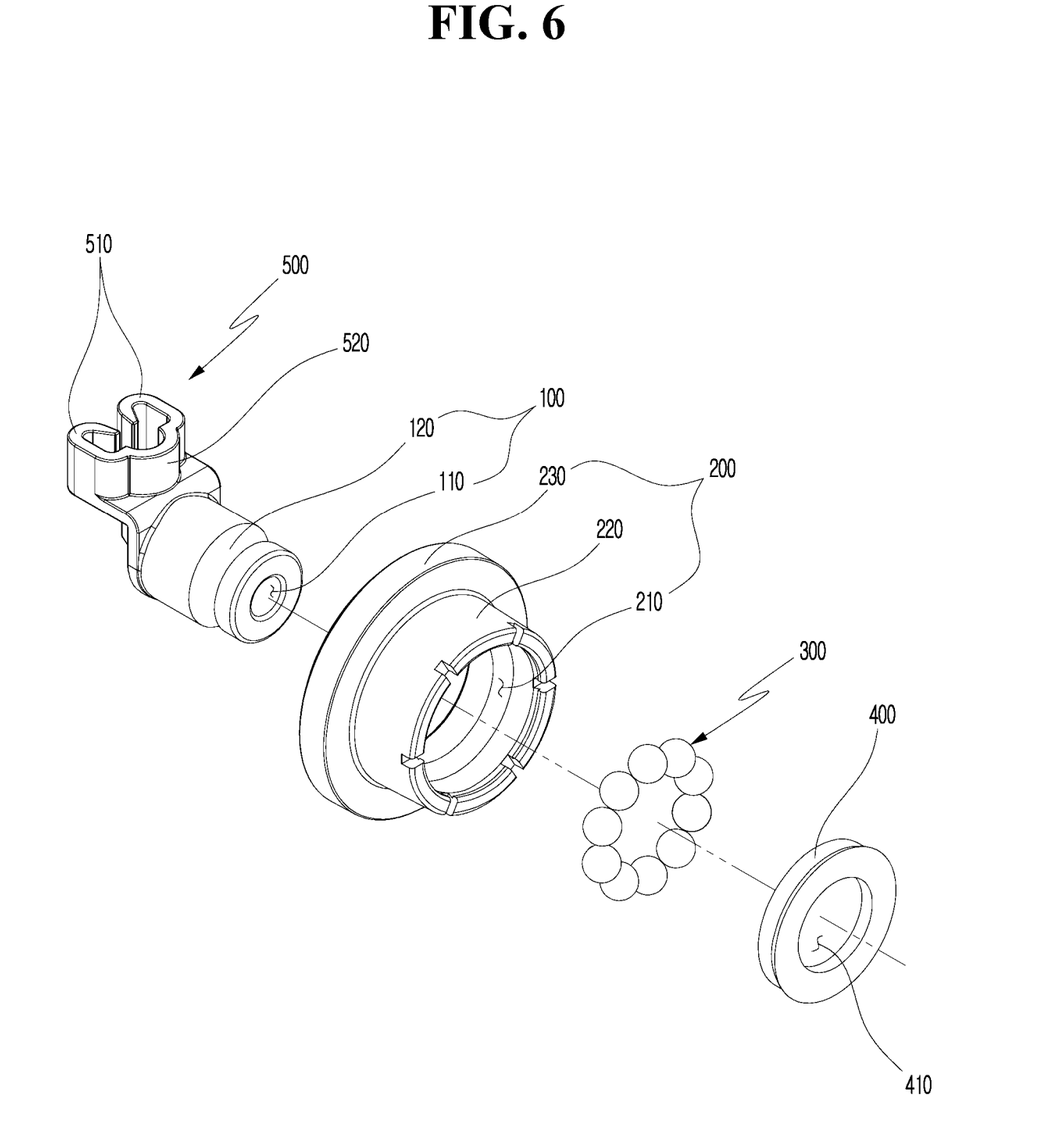
FIG. 6 is a front exploded perspective view of a ball bearing roller assembly according to an embodiment of the present invention.
Figure 7:
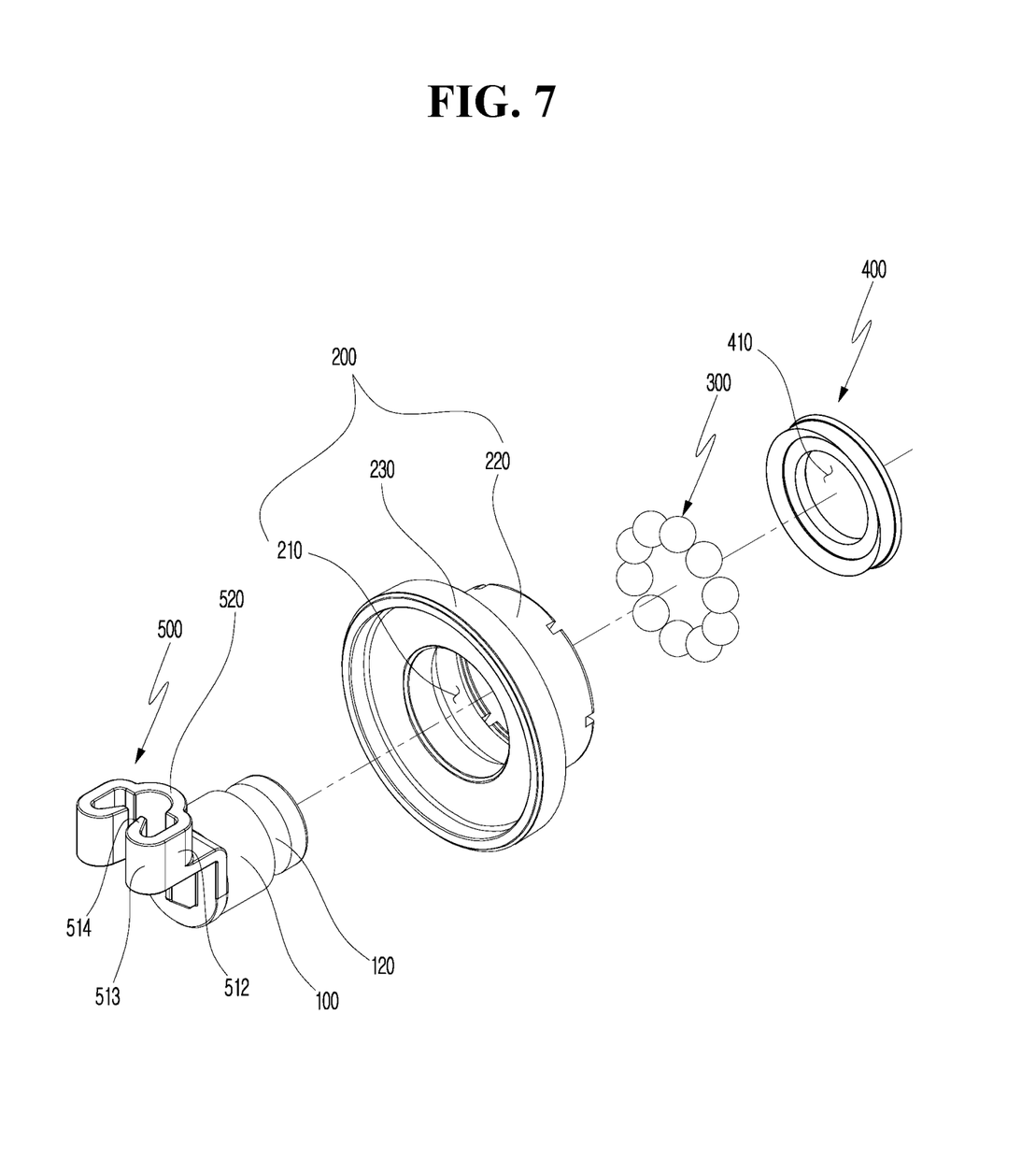
FIG. 7 is a rear exploded perspective view of a ball bearing roller assembly according to an embodiment of the present invention.
Figure 8:
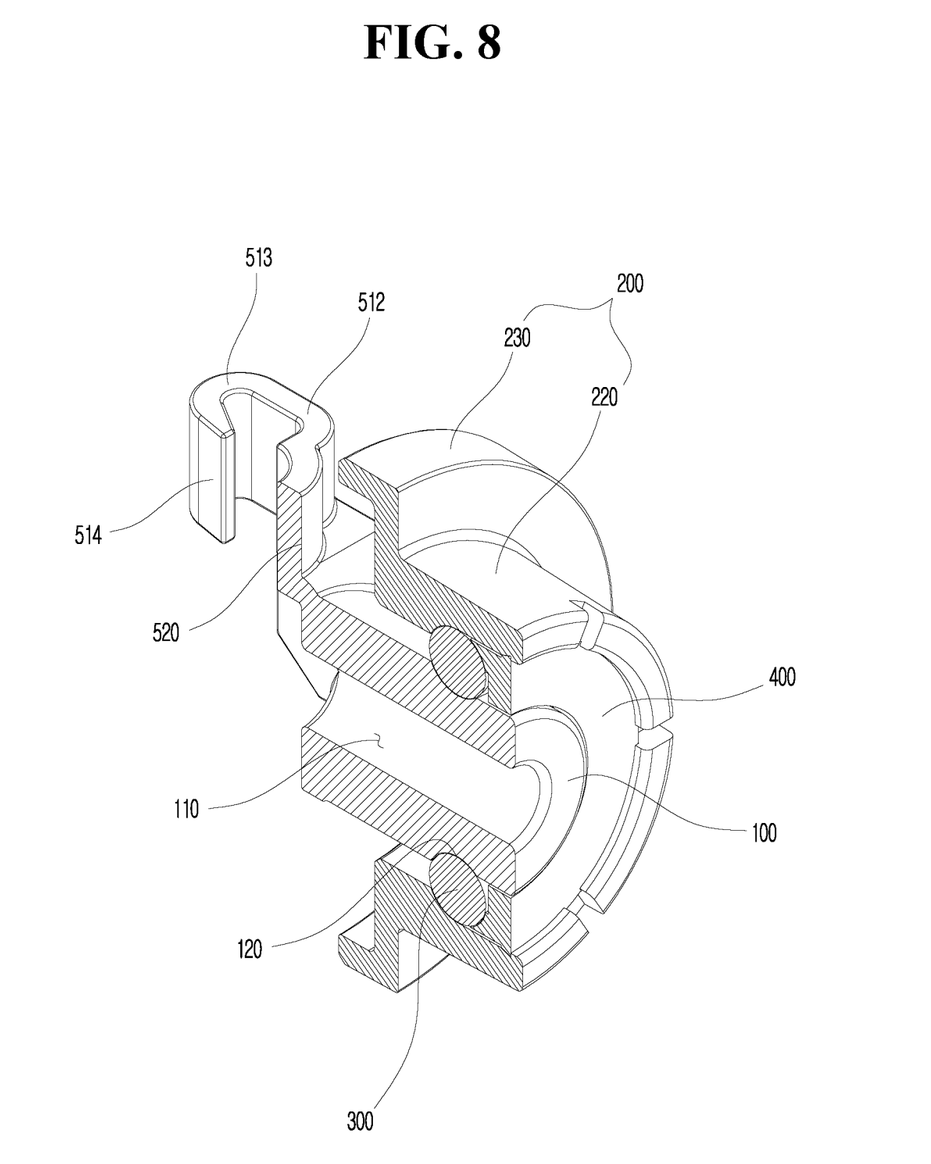
FIG. 8 is a cross-sectional view of FIG. 4, taken along line I-I.

FIG. 4 is a front perspective view of a ball bearing roller assembly according to an embodiment of the present invention; FIG. 5 is a plane view of a ball bearing roller assembly according to an embodiment of the present invention; FIG. 6 is a front exploded perspective view of a ball bearing roller assembly according to an embodiment of the present invention; FIG. 7 is a rear exploded perspective view of a ball bearing roller assembly according to an embodiment of the present invention; and FIG. 8 is a cross-sectional view of FIG. 4, taken along line I-I.

Here, elements indicated by the same reference numerals as those shown in FIG. 1 to FIG. 3 have the same functions, and the detailed description thereon is omitted.

As illustrated in FIG. 4 to FIG. 8, the ball bearing roller assembly 1000 may comprise an inner ring 100, an outer ring 2000, at least one ball bearing 300, a cover 400 and a detachable coupling part 500.

Here, an insertion hole 110 is formed in the inner ring 100. A protrusion 2210 formed in the storage body 2000 may be inserted into the insertion hole 110. When the protrusion 2210 is inserted into the insertion hole 110 of the inner ring 100, the inner ring 100 may be supported and fixed to the storage body 2000.

Meanwhile, an outer ring 200 is provided outside the inner ring 100.

A hollow 210 through which the inner ring 100 is inserted is formed in the outer ring 200.

The outer ring 200 is rotatable with respect to the inner ring 100 fixed to the storage body 2000. Here, the outer ring 200 may rotate with respect to the inner ring 100 by the ball bearing 300 provided between the inner ring 100 and the outer ring 200.

The outer ring 200 may comprise a body part 220 and a guide flange 230.

The hollow 210 is formed in the body part 220, so that the inner ring 100 may be inserted through the body part 220.

In addition, the guide flange 230 is formed to be connected with the body part 220. The guide flange 230 is formed to have an outer diameter greater than the body part 220, to guide the moving direction of the ball bearing roller assembly 1000 moving along the rail.

For example, the ball bearing roller assembly 1000 moves along the rail 3000, while the body part 220 is placed on the "L"-shaped rail 3100 provided in the household appliances.

At this time, the guide flange 230 is disposed on one side of the end of the rail 3000 to guide the moving direction of the rail 3000. That is, when a user moves the storage body 2000 into the main body of the dishwasher from the outside or moves the storage body out of the main body of the main body of the dishwasher from the inside, the guide flange 230 prevents shaking and separation of the storage body 2000 and guides the moving direction of the ball bearing roller assembly 1000.

Meanwhile, at least one ball bearing 300 is provided between the inner ring 100 and the outer ring 200.

The ball bearing 300 is in rolling contact with the inner ring 100 and the outer ring 200, so that the outer ring 200 may rotate with respect to the inner ring 100.

At least one ball bearing 300 is in rolling contact with an annular groove 120 formed on the outer circumferential surface of the inner ring 100 and the inner circumferential surface of the body part 220. At this time, the annular groove 120 of the inner ring 100 has a shape corresponding to the spherical surface of the ball bearing 300, and is in rolling contact with the ball bearing 300 while receiving the lower side of the ball bearing 300.

Accordingly, shaking may be prevented while the at least one ball bearing 300 rotates, and the outer ring 200 may smoothly rotate.

Meanwhile, the cover 400 is provided in a space S between the inner ring 100 and the outer ring 200.

More specifically, the cover 400 is inserted into the space S between the inner ring 100 and the outer ring 200 after the ball bearing 300 is disposed between the inner ring 100 and the outer ring 200, and the cover 400 fixes the ball bearing 300 to the outer circumferential surface of the inner ring 100 and the inner circumferential surface of the outer ring 200 by being coupled with the outer ring 200. That is, the cover 400 fixes and supports the ball bearing 300 while being in contact with one side thereof.

Accordingly, the ball bearing 300 is supported in the manner of being in contact with the outer circumferential surface of the inner ring 100, the inner circumferential surface of the outer ring 200 and the one side of the cover 400.

At this time, a through hole 410 may be formed in the center of the cover 400 so as to be inserted and coupled to the space S, and one end of the inner ring 100 may be inserted through the through hole 410.

The cover 400 may be coupled to the space S in the manner of being assembled with the outer ring 200. The manner of coupling the cover 400 is not limited thereto, but any manner that can easily couple the cover 400 with the inner ring 100 or the outer ring 200 may be used.

With reference to FIG. 3 and FIG. 4, the inner ring 100 and the outer ring 200 may be configured to perform predetermined relative movement in the width direction W according to the degree of width direction W coupling depth with which the cover 400 is coupled with the outer ring 200.

That is, an annular groove 120 is formed only on the outer circumferential surface of the inner ring 100 and no groove is formed on the inner circumferential surface of the outer ring 200, and thus the outer ring 200 may perform predetermined movement in the width direction W according to the degree of coupling of the cover 400. Accordingly, the left and right side movement of the storage body 2000 and the impact thereon may be easily absorbed.

Meanwhile, a detachable coupling part 500 is detachable from the storage body 2000.

The detachable coupling part 500 has one end coupled to the inner ring 100 and the other end coupled to the storage body 2000. At this time, the detachable coupling part 500 may be detached from the lower end of the vertical wire 2200 of the storage body 2000.

The detachable coupling part 500 may comprise a fixing part 510 and a receiving part 520.

Here, a pair of fixing parts 510 has one ends coupled to the inner ring 100 and is spaced apart from each other. In addition, the pair of fixing parts 510 spaced apart from each other forms an insertion space part 511.

The vertical wire 2200 may be inserted into the insertion space part 511. That is, at the same time when or after a protrusion 2210 of the vertical wire 2200 is inserted into the insertion hole 110 of the inner ring 100, the vertical wire 2200 is inserted and coupled to the insertion space part 511.

The receiving part 520 connects the pair of fixing parts 510 spaced apart from each other and receives the vertical wire 2200 when the vertical wire 2200 is inserted into the detachable coupling part 500 through the insertion space part 511.

At this time, the receiving part 520 may be provided with the concavely curved surface so that the vertical wire 2200 may be more easily received and supported. In addition, a guide support part may be further provided at both sides of the receiving part 520 to prevent separation of the vertical wire 2200 in the lateral direction.

Meanwhile, the width of the insertion space part 511 may be formed to be smaller than the width of the vertical wire 2200. That is, the distance between the pair of fixing parts 510 is smaller than the diameter of the vertical wire 2200.

Accordingly, when coupled to the vertical wire 200 through the insertion space part 511, the detachable coupling part 500 may be coupled with the vertical wire 200 while the pair of fixing parts 510 is elastically deformed to a certain degree in the respective outward directions by the vertical wire 200.

At this time, the pair of fixing parts 510 may be provided with a support part 512, a connection part 513 and a separation preventing part 514.

The support part 512 has one end coupled to the inner ring 100, and supports elastic deformation of the fixing part 510 when coupled to the vertical wire 2200.

The connection part 513 is formed to extend from the support part 512, and is bent in the direction that the pair of fixing parts 510 faces each other. The outer surface of the connection part 513 may be formed in a gently curved shape to facilitate insertion of the vertical wire 2200. Accordingly, the vertical wire 2200 may be easily introduced into the detachable coupling part 500 while being guided along the gently curved shape of the pair of connection parts 513 when coupling.

The separation preventing part 514 is formed to extend from the connection part 513, and prevents separation of the vertical wire 2200 when the vertical wire 2200 is inserted into the detachable coupling part 500.

Meanwhile, when an external force is applied to separate the ball bearing roller assembly 1000 from the storage body 2000, the separation preventing part 514 is in contact with the vertical wire 2200, the external force is delivered in the outward direction through the connection part 513 and the support part 514, and the gap between the pair of fixing parts 510 is widened. Thereby, the vertical wire 2200 is detachable from the inside of the detachable coupling part 500.

Meanwhile, regarding a method for assembling the ball bearing roller assembly 1000 of the present invention, first, the inner ring 100 is fixed, and the outer ring 200 is placed on the inner ring 100. Then, at least one ball bearing 300 is disposed in the space S between the inner ring 100 and the outer ring 200 and pressed to the inside for coupling. Finally, the cover 400 is coupled to the inner ring 100 or the outer ring 200, and the assembling of the ball bearing roller assembly 1000 is completed.

As such, the ball bearing roller assembly 1000 can be assembled in a simple coupling manner, thereby improving productivity.

The foregoing description of the present invention has been presented for illustrative purposes, and it is apparent to a person having ordinary skill in the art that the present invention can be easily modified into other detailed forms without changing the technical idea or essential features of the present invention. Therefore, it should be understood that the forgoing embodiments are by way of example only, and are not intended to limit the present disclosure. For example, each component which has been described as a unitary part can be implemented as distributed parts. Likewise, each component which has been described as distributed parts can also be implemented as a combined part.

The scope of the present invention is presented by the accompanying claims, and it should be understood that all changes or modifications derived from the definitions and scopes of the claims and their equivalents fall within the scope of the present invention.

EXPLANATION OF REFERENCE NUMERALS

1000 ball bearing roller assembly
2000 storage body
2100 horizontal wire
2200 vertical wire
2210 protrusion
3000 rail
100 inner ring
110 insertion hole
120 annular groove
200 outer ring
210 hollow
220 body part
230 guide flange
300 ball bearing
400 cover
410 through hole
500 detachable coupling part
510 fixing part
511 insertion space part
512 support part
513 connection part
514 separation preventing part
520 receiving part

What is claimed is:

1. A ball bearing roller assembly, comprising:
   an inner ring having an insertion hole into which a protrusion of a storage body is inserted;
   an outer ring having a hollow through which the inner ring is inserted, and provided outside the inner ring;
   at least one ball bearing provided between the inner ring and the outer ring, and being in rolling contact with the inner ring and the outer ring;
   a cover coupled with the outer ring, and fixing the ball bearing to the outer circumferential surface of the inner ring and the inner circumferential surface of the outer ring; and
   a detachable coupling part formed to extend from one end of the inner ring, and provided with an insertion space part into which a vertical wire of the storage body is inserted,
   wherein the inner ring and the outer ring are configured to perform predetermined relative movement in the width direction W according to the degree of width direction W coupling depth with which the cover is coupled with the outer ring.

2. The ball bearing roller assembly of claim 1, wherein an annular groove in rolling contact with the ball bearing is formed on the outer circumferential surface of the inner ring.

3. The ball bearing roller assembly of claim 1, wherein the detachable coupling part comprises:
   a pair of fixing parts having one end coupled to the inner ring; and
   a receiving part connecting the pair of fixing parts spaced apart from each other, and receiving the vertical wire,
   wherein the pair of fixing parts spaced apart from each other forms the insertion space part, and the width of the insertion space part is formed to be smaller than the width of the vertical wire.

4. The ball bearing roller assembly of claim 3, wherein the pair of fixing parts is provided with:
   a support part having one end coupled to the inner ring;
   a connection part formed to extend from the support part, and bent in the inward direction; and
   a separation preventing part formed to extend from the connection part, and preventing separation of the vertical wire when the vertical wire is inserted.

5. The ball bearing roller assembly of claim 4, wherein the outer surface of the connection part is formed in a curved shape to facilitate insertion of the vertical wire.

6. The ball bearing roller assembly of claim 1, wherein the outer ring comprises:
   a body part into which the inner ring is inserted; and
   a guide flange having an outer diameter greater than the body part, and connected with the body part.

7. The ball bearing roller assembly of claim 1, wherein the detachable coupling part comprises a pair of fixing parts having one end coupled to the inner ring, the pair of fixing parts being provided with:
   a support part having one end coupled to the inner ring;
   a connection part formed to extend from the support part, and bent in the inward direction; and
   a separation preventing part formed to extend from the connection part, and bent in the inward direction so as to face the vertical wire.

\* \* \* \* \*